(12) United States Patent
Sumi et al.

(10) Patent No.: US 7,019,079 B2
(45) Date of Patent: Mar. 28, 2006

(54) TETRAFLUOROETHYLENE/ETHYLENE COPOLYMER COMPOSITION

(75) Inventors: Naoko Sumi, Chiba (JP); Shigeru Aida, Chiba (JP); Atsushi Funaki, Chiba (JP); Masahide Yodogawa, Hyogo (JP); Tsuyoshi Iwasa, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 221 days.

(21) Appl. No.: 10/676,122

(22) Filed: Oct. 2, 2003

(65) Prior Publication Data

US 2004/0116606 A1    Jun. 17, 2004

(30) Foreign Application Priority Data

| Oct. 4, 2002 | (JP) | ............................. 2002-292367 |
| Apr. 14, 2003 | (JP) | ............................. 2003-108874 |
| Aug. 8, 2003 | (JP) | ............................. 2003-289876 |

(51) Int. Cl.
  *C08L 214/26*    (2006.01)
  *C08L 23/00*    (2006.01)
  *C08L 23/04*    (2006.01)
  *C08L 27/12*    (2006.01)

(52) U.S. Cl. ...................... 525/199; 525/200; 525/240

(58) Field of Classification Search ................ 525/199, 525/200, 240

See application file for complete search history.

(56) References Cited

U.S. PATENT DOCUMENTS

| 6,461,719 | B1 * | 10/2002 | Ichikuni et al. ............. 428/147 |
| 6,521,708 | B1 * | 2/2003 | Lee et al. .................... 525/199 |
| 6,855,787 | B1 * | 2/2005 | Funaki et al. ................ 526/250 |

FOREIGN PATENT DOCUMENTS

| EP | 0 957 148 | 11/1999 |
| EP | 0 969 023 | 1/2000 |
| EP | 0 974 979 | 1/2000 |
| EP | 1 090 955 | 4/2001 |

OTHER PUBLICATIONS

U.S. Appl. No. 11/023,486, filed Dec. 29, 2004, Funaki et al.
U.S. Appl. No. 10/756,312, filed Jan. 14, 2004, Funaki et al.

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

A tetrafluoroethylene/ethylene copolymer composition comprising a tetrafluoroethylene/ethylene copolymer (A) and a thermoplastic fluoropolymer (B) having a crystallization temperature higher than the crystallization temperature of said tetrafluoroethylene/ethylene copolymer (A) in a mass ratio of (A)/(B)=from 99.8/0.2 to 1/99. The composition is excellent in melt processability, and its formed product is excellent in mechanical properties and fuel barrier properties.

18 Claims, No Drawings

TETRAFLUOROETHYLENE/ETHYLENE COPOLYMER COMPOSITION

The present invention relates to a tetrafluoroethylene/ethylene copolymer composition.

Fluorocarbon resins are excellent in chemical resistance, weather resistance, heat resistance, gas barrier properties, fuel barrier properties, non-tackiness, etc., and they are used in a wide range of fields. Among them, a tetrafluoroethylene/ethylene copolymer (hereinafter referred to as ETFE) is excellent in melt processability, and its formed product is excellent in fuel barrier properties, chemical resistance against erosive liquids such as methanol, etc., and its application as a material for a fuel hose for automobiles is being studied.

Particularly, a fuel hose made of a multilayered laminate containing a layer of ETFE, is being studied as one satisfying various required properties. In such a fuel hose, as the material of the inner layer which will be in contact directly with a fuel, ETFE is used as it is excellent in fuel barrier properties and chemical resistance, while as the material of the outer layer of the fuel hose, a non-fluorocarbon type thermoplastic resin such as a polyamide resin such as polyamide 6, polyamide 11 or polyamide 12, is employed as it is excellent in mechanical properties and durability (e.g. JP-A-11-320770).

In recent years, along with reinforcement of legal regulations against the amount of a fuel leaking from a fuel hose by permeation or evaporation, it is desired to develop a fluorocarbon resin superior in fuel barrier properties to presently commercially available ETFE.

For example, with ETFE, it is known that the higher the crystallinity, better the gas barrier properties, but with ETFE having a high crystallinity and a high crystallization temperature, the melt processability is not adequate, and the mechanical properties such as stress cracking resistance of the formed product are not adequate (e.g. "Fluorocarbon Resin Handbook" compiled by Takaomi Satokawa, published by THE NIKKAN KOGYO SHINBUN, LTD., Nov. 30, 1990, p. 470–471, p. 452–456, p. 464–467).

The present inventors have found that with respect to a thermoplastic fluorocarbon resin such as ETFE, one having a high crystallinity is excellent not only in the gas barrier properties, but also in the fuel barrier properties and have conducted an extensive study to effectively utilize such properties, and as a result, the present invention has been accomplished.

It is an object of the present invention to solve the above-mentioned problems and to provide an ETFE composition which is excellent in melt processability and a formed product which is excellent in mechanical properties and fuel barrier properties.

The present invention provides an ETFE composition comprising ETFE (A) and a thermoplastic fluoropolymer (B) having a crystallization temperature higher than the crystallization temperature of said ETFE (A) in a mass ratio of (A)/(B)=from 99.8/0.2 to 1/99.

Now, the present invention will be described in detail with reference to the preferred embodiments.

In the present invention, ETFE (A) is a copolymer comprising polymerized units based on tetrafluoroethylene (hereinafter referred to as TFE) and polymerized units based on ethylene (hereinafter referred to as E). The molar ratio of the polymerized units based on TFE to the polymerized units based on E, is preferably from 40/60 to 80/20, more preferably from 50/50 to 70/30. If the molar ratio of the polymerized units based on TFE is too small, the heat resistance, weather resistance, chemical resistance, gas barrier properties, fuel barrier properties, etc. of the formed product of the ETFE composition, tend to be low, and if the molar ratio of the polymerized units based on TFE is too large, the melt processability of the ETFE composition tends to be inadequate, and the mechanical strength, etc. of the formed product of the ETFE composition tend to be low. If the molar ratio is within the above range, ETFE (A) and the ETFE composition are excellent in the melt processability, and the formed product of the ETFE composition is excellent in the heat resistance, weather resistance, chemical resistance, gas barrier properties, fuel barrier properties, mechanical strength, etc.

In the present invention, ETFE (A) preferably contains, in addition to the polymerized units based on TFE and E, polymerized units based on another monomer (a) copolymerizable with TFE and E.

Such another monomer (a) copolymerizable with TFE and E, may, for example, be a fluoroolefin (excluding TFE) such as vinylidene fluoride, chlorotrifluoroethylene (hereinafter referred to as CTFE), hexafluoropropylene (hereinafter referred to as HFP), $CF_2=CFR^1$ (wherein $R^1$ is a $C_{2-6}$ perfluoroalkyl group, the same applies hereinafter), $CH_2=CHR^2$ (wherein $R^2$ is a $C_{1-8}$ polyfluoroalkyl group, the same applies hereinafter), $CF_2=CHR^3$ (wherein $R^3$ is a $C_{1-6}$ perfluoroalkyl group, the same applies hereinafter) or $CH_2=CFR^2$, a fluorovinyl ether such as $CF_2=CFOR^4$ (wherein $R^4$ is a $C_{1-10}$ perfluoroalkyl group which may contain an oxygen atom), a functional group-containing fluorovinyl ether such as $CF_2=CFOR^5COX^1$ (wherein $R^5$ is a $C_{1-10}$ bivalent perfluoroalkylene group which may contain an oxygen atom, and $X^1$ is a hydroxyl group, a $C_{1-3}$ alkoxy group or a halogen atom) or $CF_2=CFOR^6SO_2X^2$ (wherein $R^6$ is a $C_{1-10}$ bivalent perfluoroalkylene group which may contain an oxygen atom, and $X^2$ is a halogen atom or a hydroxyl group), $CF_2=CF(CF_2)_nOCF=CF_2$ (wherein n is 1 or 2), perfluoro(2-methylene-4-methyl-1,3-dioxolane), a hydrocarbon olefin (excluding E) such as propylene or butene, an aliphatic vinyl carboxylate such as vinyl acetate or vinyl butanoate, a polymerizable unsaturated compound having an acid anhydride structure, such as maleic anhydride, itaconic anhydride or citraconic anhydride, or a vinyl ether such as hydroxybutyl vinyl ether or glycidyl vinyl ether. As such another monomer (a) copolymerizable with TFE and E, one type may be used alone, or two or more types may be used in combination.

As such another monomer (a) copolymerizable with TFE and E, $CH_2=CHR^2$, HFP, $CF_2=CFOR^4$ or a polymerizable unsaturated compound having an acid anhydride structure, is preferred. When polymerized units based on the polymerizable unsaturated compound having an acid anhydride structure are contained, the layer of the ETFE composition and the layer of a thermoplastic resin such as a polyamide, which are laminated in e.g. a fuel hose, will be excellent in adhesion. Whereas, when polymerized units based on the above $CH_2=CHR^2$ are contained, the formed product of the ETFE composition will be excellent in the mechanical properties. As $R^2$, a $C_{1-6}$ perfluoroalkyl group is more preferred, and a $C_{2-4}$ perfluoroalkyl group is most preferred.

The content of the polymerized units based on such another monomer (a) copolymerizable with TFE and E, is preferably from 0.05 to 20 mol %, more preferably from 0.1 to 15 mol %, most preferably from 0.1 to 10 mol %, based on the total polymerized units in ETFE (A). If the content of the polymerized units based on such another monomer (A) copolymerizable with TFE and E, is within this range, the crystallization temperature of ETFE (A) can be controlled in a range of from 150 to 290° C., whereby the melt processability will be excellent, and the formed product of the ETFE composition will be excellent in the mechanical properties. In a case where another monomer (a) is the polymerizable unsaturated compound having an acid anhydride structure, its content is preferably from 0.05 to 5 mol %, most preferably from 0.05 to 1 mol %. If the content of the polymerized units based on the polymerizable unsaturated compound having an acid anhydride structure, is within this range, the layer of the ETFE composition to be laminated, will be excellent particularly in the adhesion with a layer of a polyamide.

As a specific example of ETFE (A) of the present invention, a copolymer of TFE, E, $CH_2=CHR^2$ and the polymerizable unsaturated compound having an acid anhydride structure, is preferred. Particularly, it is more preferred that $CH_2=CHR^2$ is $CH_2=CH(CF_2)_2F$ or $CH_2=CH(CF_2)_4F$, and the polymerizable unsaturated compound having an acid anhydride structure, is itaconic anhydride or citraconic anhydride.

The melt flow rate (hereinafter referred to as MFR) of ETFE (A) is preferably from 2 to 100 g/10 min, more preferably from 10 to 70 g/10 min. MFR is an index of the molecular weight. Namely, the larger the MFR, the smaller the molecular weight and the higher the melt flowability. Likewise, the smaller the MFR, the larger the molecular weight, and the lower the melt flowability. If it is smaller than this, the melt processability tends to be inadequate, and if it is larger than this, the mechanical strength or the dimensional stability at the time of processing tends to be inadequate. When it is within this range, the melt processability will be excellent, the mechanical strength will be excellent, and the dimensional stability at the time of processing will be also excellent.

The crystallization temperature of ETFE (A) is preferably from 150 to 290° C., more preferably from 180 to 280° C., most preferably from 210 to 240° C. If it is within this range, the melt processability will be excellent.

In the present invention, the thermoplastic fluorocopolymer (B) is preferably a polymer or copolymer of a fluoroolefin, or a copolymer of a fluoroolefin with another monomer (b).

The fluoroolefin may, for example, be TFE, vinylidene fluoride, CTFE, vinyl fluoride, trifluoroethylene, HFP or $CF_2=CFR^1$. The fluoroolefins may be used alone or in combination of two or more of them.

As another monomer (b), a fluorovinyl ether such as $CF_2=CFOCF_3$ or $CF_2CFOR^4$, $CF_2=CF(CF_2)_nOCF=CF_2$, perfluoro(2-methylene-4-methyl-1,3-dioxolane) or a hydrocarbon olefin such as E, propylene or butene, may be mentioned. As such another monomer (b), one type may be used, or two or more types may be used in combination.

As a specific example of the thermoplastic fluoropolymer (B), at least one member selected from the group consisting of ETFE, a TFE/HFP copolymer, a $TFE/CF_2=CFOC_3F_7$ copolymer, a CTFE/E copolymer and a TFE/vinylidene fluoride/HFP copolymer, is preferred, and ETFE is more preferred.

In a case where the thermoplastic fluoropolymer (B) is ETFE (hereinafter referred to as ETFE (B)), the molar ratio of polymerized units based on TFE to polymerized units based on E in ETFE (B) is preferably from 40/60 to 70/30, more preferably from 50/50 to 65/35. Further, ETFE (B) preferably contains, in addition to polymerized units based on TFE and E, polymerized units based on another monomer (c) copolymerizable with TFE and E.

Such another monomer (c) copolymerizable with TFE and E may, for example, be a fluoroolefin (excluding TFE) such as vinylidene fluoride, CTFE, HFP, $CF_2=CFR^1$, $CH_2CHR^2$, $CF_2=CHR$ or $CH_2=CFR^2$, or a fluorovinyl ether such as $CF_2=CFOR^4$. As such another monomer (c), one type may be used, or two or more types may be used in combination. As such another monomer (c), $CH_2=CHR^2$ is preferred, and $CH_2=CHR^2$ wherein R is a $C_{2-4}$ perfluoroalkyl group, is more preferred. As a specific example of $CH_2=CHR^2$, $CH_2=CH(CF_2)_2F$, $CH_2=CH(CF_2)_3F$ or $CH_2=CH(CF_2)_4F$ is more preferred.

The content of the polymerized units based on such another monomer (c) copolymerizable with TFE and E, is preferably from 0.05 to 10 mol %, more preferably from 0.1 to 5 mol %, most preferably from 0.1 to 2 mol %, based on the total polymerized units in ETFE (B). When the content of the polymerized units based on such another monomer (c) is within this range, the formed product of the ETFE composition will be excellent in the mechanical properties and fuel barrier properties.

In the present invention, the thermoplastic fluoropolymer (B) has a crystallization temperature higher than the crystallization temperature of ETFE (A). The crystallization temperature of the thermoplastic fluoropolymer (B) is preferably within a range of higher than the crystallization temperature of ETFE (A) and at most 150° C. The crystallization temperature of the thermoplastic fluoropolymer (B) is more preferably higher by from 3 to 150° C., more preferably higher by from 3 to 100° C., most preferably higher by from 3 to 70° C., than the crystallization temperature of ETFE (A). If the crystallization temperature is within this range, mixing of ETFE (A) with the thermoplastic fluoropolymer (B) will be easy, and the formed product of the resulting ETFE composition will be excellent in the fuel barrier properties.

The crystallization temperature of the thermoplastic fluoropolymer (B) will be influenced by the composition of the polymerized units based on the fluoroolefin and another monomer (c), to be contained. Accordingly, the crystallization temperature is adjusted by properly selecting the composition. For example, in the case of ETFE, the crystallization temperature will be higher as the molar ratio of the polymerized units based on TFE to the polymerized units based on E is made closer to 50/50. Further, the crystallization temperature becomes higher, as the content of the polymerized units based on another monomer (c) is made to be smaller. In the cases of the TFE/HFP copolymer, the $TFE/CF_2=CFOC_3F_7$ copolymer and the TFE/vinylidene fluoride/HFP copolymer, the crystallization temperature becomes higher, as the content of the polymerized units based on TFE is made to be higher. Further, in the case of the CTFE/E copolymer, the crystallization temperature becomes higher, as the molar ratio of the polymerized units based on CTFE to the polymerized units based on E is made to be closer to 50/50.

MFR of the thermoplastic fluoropolymer (B) is not particularly limited, but it is preferably from 0.1 to 150 g/10 min, more preferably from 5 to 100 g/10 min. If it is within this range, mixing of ETFE (A) with the thermoplastic fluoropolymer (B) will be easy, and the formed product of the resulting ETFE composition will be excellent in the fuel barrier properties.

The method for producing ETFE (A) and the thermoplastic fluoropolymer (B) is not particularly limited, and a polymerization method using a commonly employed radical polymerization initiator, may be employed. As examples of such a polymerization method, bulk polymerization, solution polymerization using an organic solvent such as a fluorinated hydrocarbon, a chlorinated hydrocarbon, a fluorochlorinated hydrocarbon, an alcohol or a hydrocarbon, suspension polymerization using an aqueous medium and, if necessary, a proper organic solvent, and emulsion polymerization using an aqueous medium and an emulsifier, may be mentioned, but solution polymerization is most preferred.

As the radical polymerization initiator, one having a 10 hours half-life period and a decomposition temperature of from 0° C. to 100° C. is preferred, and one having a decomposition temperature of from 20 to 90° C. is more preferred. Specific examples include an azo compound such as azobisisobutyronitrile, a non-fluorinated diacyl peroxide such as isobutyryl peroxide, octanoyl peroxide, benzoyl peroxide or lauroyl peroxide, a peroxy dicarbonate such as diisopropyl peroxy dicarbonate, a peroxy ester such as tert-butylperoxy pivalate, tert-butylperoxy isobutyrate or tert-butylperoxy acetate, a fluorinated diacyl peroxide such as a compound of the formula $(Z(CF_2)_pCOO)_2$ (wherein Z is a hydrogen atom, a fluorine atom or a chlorine atom, and p is an integer of from 1 to 10), and an inorganic peroxide such as potassium persulfate, sodium persulfate or ammonium persulfate.

Further, in the present invention, it is also preferred to use a chain transfer agent to control the MFR of ETFE (A) and the thermoplastic fluoropolymer (B). Such a chain transfer agent may, for example, be an alcohol such as methanol or ethanol, a chlorofluorohydrocarbon such as 1,3-dichloro-1,1,2,2,3-pentafluoropropane or 1,1-dichloro-1-fluoroethane, or a hydrocarbon such as pentane, hexane or cyclohexane. Further, it is preferred to use a chain transfer agent having a functional group such as an ester group, a carbonate group, a hydroxyl group, a carboxyl group or a carbonyl fluoride group, whereby a functional group having a reactivity with a thermoplastic resin such as a polyamide will be introduced to a molecular terminal, and the adhesion between the layer of the ETFE composition and the layer of the thermoplastic resin, to be laminated, will be excellent. As such a chain transfer agent, acetic anhydride, propionic anhydride, acetic acid, ethylene carbonate, ethylene glycol or propylene glycol may, for example, be mentioned.

In the present invention, the polymerization conditions are not particularly limited. The polymerization temperature is preferably from 0 to 100° C., more preferably from 20 to 90° C. The polymerization pressure is preferably from 0.1 to 10 MPa, more preferably from 0.5 to 3 MPa. The polymerization time is preferably from 1 to 30 hours.

The ETFE composition of the present invention comprises ETFE (A) and the thermoplastic fluoropolymer (B) in a mass ratio of (A)/(B)=from 99.8/0.2 to 1/99. Preferably, (A)/(B)=from 99.8/0.2 to 10/90, more preferably, (A)/(B)=from 99/1 to 10/90, more preferably from 95/5 to 90/10, most preferably from 85/15 to 15/85. If the ratio of the thermoplastic fluoropolymer (B) is too small, the fuel barrier properties tend to be inadequate, and if it is too large, the melt processability of the ETFE composition or the mechanical properties of its formed product tend to be low. When it is in this range, the ETFE composition will be excellent in the melt processability, and its formed product will be excellent in the fuel barrier properties and mechanical properties.

A method for producing the ETFE composition of the present invention is not particularly limited, and it is preferred to mix ETFE (A) with the thermoplastic fluoropolymer (B) by using a commonly employed mixing method. The mixing method may, for example, be a method wherein the thermoplastic fluoropolymer (B) is added, with stirring, to ETFE (A) melted by means of a melt kneader, or a method wherein ETFE (A) and the thermoplastic fluoropolymer (B) are preliminarily mixed and then kneaded by means of a single screw or twin screw extruder. Especially, a mixing method employing an extruder is simple and preferred. The forms of the ETFE (A) and the thermoplastic fluoropolymer (B) to be mixed, are not particularly limited, and pellets, beads, powders, etc., may be employed.

The ETFE composition of the present invention preferably further contains an electroconductive filler (C). Such an electroconductive filler (C) is preferably a carbon type electroconductive filler having a nitrogen adsorption specific surface area of from 50 to 1000 $m^2/g$ and a dibutyl phthalate (hereinafter referred to as DBP) absorption of from 100 ml/100 g to 1000 ml/100 g. More preferred is a carbon type conductive filler having a nitrogen adsorption specific surface area of from 60 to 600 $m^2/g$ and a DBP absorption of from 150 to 1000 ml/100 g. If the nitrogen adsorption specific surface area is less than 50 $m^2/g$, the electroconductivity tends to be low, and if it is larger than 1000 $m^2/g$, the electroconductive filler is likely to coagulate, and the surface smoothness of the formed product tends to be lost. If the DBP absorption is less than 100 ml/100 g, the electroconductivity tends to be low, and if it is larger than 1000 ml/100 g, the surface smoothness of the formed product tends to be lost. When the nitrogen adsorption specific surface area and the DBP absorption are within the above identified ranges, the electroconductivity will be high, and the formed product will be excellent in surface smoothness.

As a specific example of the carbon type electroconductive filler, carbon nanotube, carbon nanohorn, or carbon black such as acetylene black or Ketjenblack, may for example, be mentioned. The carbon nanotube is also called a hollow carbon microfiber.

The carbon nanotube and the carbon nanohorn preferably has a diameter of from 3.5 to 70 nm and an aspect ratio of from 5 to 200, more preferably has a diameter of from 5 to 60 nm and an aspect ratio of from 5 to 200, most preferably has a diameter of from 10 to 55 nm and an aspect ratio of from 10 to 100. When the diameter and the aspect ratio are within these ranges, the formed product will be excellent in surface smoothness.

The average particle diameter of the carbon black is preferably from 3.5 to 70 nm, more preferably from 5 to 50 nm, most preferably from 10 to 40 nm. When it is within this range, the formed product will be excellent in surface smoothness.

The volume resistivity of the carbon type electroconductive filler is preferably from $1 \times 10^{-4}$ to $1 \times 10^2$ Ω·cm, more preferably from $1 \times 10^{-4}$ to 10 Ω·cm, most preferably from $1 \times 10^{-4}$ to 1 Ω·cm.

In the ETFE composition of the present invention, the content of the electroconductive filler (C) is preferably from 0.1 to 15 mass %, more preferably from 0.5 to 10 mass %, based on the total amount of ETFE (A) and the thermoplastic fluoropolymer (B). When the content of the electroconductive filler (C) is within this range, the electroconductivity will be excellent, the tensile elongation will be excellent, and the impact resistance will also be excellent. The volume resistivity of a formed product obtained by processing the ETFE composition of the present invention is preferably from $1 \times 10^{-1}$ to $1 \times 10^7$ Ω·cm, more preferably from $1 \times 10^{-1}$ to $1 \times 10^5$ Ω·cm.

It is also preferred that the ETFE composition of the present invention further contains various additives. As such additives, a filler such as inorganic powder, glass fiber or carbon fiber, an antistatic agent such as a metal oxide and an adhesion-imparting agent such as a silane coupling agent or a titanate type coupling agent, may, for example, be mentioned.

In the ETFE composition of the present invention, the total content of ETFE (A) and the thermoplastic fluoropolymer (B) is preferably at least 80 mass %, more preferably at least 84 mass %.

The reason as to why the ETFE composition of the present invention is excellent in melt processability and its formed product is excellent in fuel barrier properties and mechanical properties, is not necessarily clear, but is considered to be as follows. ETFE (A) is excellent in melt processability and mechanical properties. On the other hand, the thermoplastic fluoropolymer (B) has a crystallinity higher than ETFE (A) and is excellent particularly in fuel barrier properties. It is considered that as the ETFE composition of the present invention contains ETFE (A) and the thermoplastic fluoropolymer (B) in a specific ratio, it has been made possible to simultaneously accomplish the excellent melt processability and mechanical properties of ETFE (A) and particularly excellent fuel barrier properties of the thermoplastic fluoropolymer (B), which has heretofore been difficult to accomplish.

Now, the present invention will be described in detail with reference to Examples. However, it should be understood that the present invention is by no means restricted to such specific Examples. Further, the compositions, the melting points, MFR, MIT bending tests and fuel permeability coefficients of ETFE (A) and the thermoplastic fluoropolymer (B) were measured by the following methods.

Composition:

The molar ratios of the respective polymerized units in ETFE (A) and the thermoplastic fluoropolymer (B) were determined by a fluorine content analysis, a $^{19}$F-NMR analysis in a molten state and an infrared absorption spectrum analysis.

Crystallization temperature (unit: ° C.): Using a differential scanning calorimeter (manufactured by Seiko Denshi K. K.), the sample was maintained at 300° C. for 10 minutes in a dry air stream and then cooled at a rate of 10° C./min, whereby the crystallization peak was recorded, and the temperature corresponding to the maximum value was taken as the crystallization temperature.

MFR (unit: g/10 min): Using a melt indexer (manufactured by Toyo Seiki Seisaku-sho, Ltd.), the mass (g) of ETFE (A) or the thermoplastic fluoropolymer (B) discharged in a unit time (10 minutes) from a nozzle having a diameter of 2 mm and a length of 8 mm at a temperature of 297° C. under a load of 5 kg, was measured and taken as MFR.

MIT bending test (unit: times): Measured in accordance with ASTM D2176. A test specimen having a width of 12.5 mm, a length of 130 mm and a thickness of 0.23 mm was mounted on a MIT measuring apparatus (manufactured by Toyo Seiki Seisaku-sho, Ltd.), and the test specimen was bent under a load of 1.25 kg at a bending angle of 135° to both the left and the right at a bending speed of 175 times/min, whereby the number of times till the breakage of the test specimen was measured. This test is a flexing fatigue test and shows that the larger the number of times, the superior the cracking resistance.

Fuel permeation coefficient (unit: g·mm/m²·day): In accordance with a cup method as stipulated by JIS Z-0208, the fuel permeation coefficient of ETFE (A) or the thermoplastic fluoropolymer (B) was measured. From 9.5 to 10 g of fuel E10 (isooctane/toluene/ethanol=45/45/10 in volume ratio) was put in a cup having a permeation area of 28.26 cm², and after covering the top of the cup with a film of ETFE (A) or the thermoplastic fluoropolymer (B) having a thickness of 100 μm, obtained by hot press molding, maintained at 60° C. for 10 days, whereupon the mass reduction was measured, and the fuel permeation coefficient was calculated. The lower the fuel permeation coefficient, the better the fuel barrier properties.

Volume resistivity (unit: Ω·cm): In accordance with a 4-probe method stipulated by JIS K7194, the volume resistivity of a formed product obtained by molding the ETFE composition was measured. With respect to a test specimen having a width of 80 mm, a length of 50 mm and a thickness of 1 mm, the volume resistivity was measured by means of a resistivity measuring device (Loresta-AP, manufactured by DIA INSTRUMENTS CO., LTD.). The lower the volume resistivity, the better the electroconductivity.

Nitrogen adsorption specific surface area (m²/g): Measured in accordance with method C of JIS K6217.

DBP absorption (ml/100 g): Measured in accordance with method A of JIS K6217.

PREPARATION EXAMPLE 1

Preparation of ETFE (A1)

A stainless steel autoclave having an internal capacity of 94 liters and equipped with a stirrer, was deaerated, and 69.7 kg of perfluoropentyldifluoromethane, 22.3 kg of $CF_2ClCF_2CHClF$ (AK225cb, manufactured by Asahi Glass Company, Limited, hereinafter referred to as AK225cb), 528 g of $CH_2=CH(CF_2)_2F$, 13.3 kg of TFE and 456 g of E were injected, and the interior of the autoclave was heated to 66° C. The pressure at that time was 1.49 MPa. As a polymerization initiator, 19 g of tert-butyl peroxypivalate was charged to initiate the polymerization. A monomer mixture gas having a molar ratio of TFE/E=60/40 was continuously charged to maintain the pressure to be constant during the polymerization. Further, $CH_2=CH(CF_2)_2F$ in an amount corresponding to 3 mol % and itaconic anhydride in an amount corresponding to 0.3 mol %, based on the total molar amount of TFE and E charged during the polymerization, were continuously charged. Upon expiration of 5.6 hours from the initiation of the polymerization and when 11.5 kg of the monomer mixture gas was charged, the inner temperature of the autoclave was cooled to room temperature, and the pressure in the autoclave was purged to normal pressure. The obtained ETFE (A1) in a slurry form was put into a granulator of 300L containing 100 kg of water charged, and the temperature was raised to 105° C. with stirring to distill off the solvent for granulation. The obtained granules were dried at 135° C. for 3 hours to obtain 12.2 kg of granules (A1) of ETFE (A1).

The composition of ETFE (A1) was such that the molar ratio of polymerized units based on TFE/polymerized units based on E/polymerized units based on $CH_2=CH(CF_2)_2F$/polymerized units based on itaconic anhydride was 58.2/38.4/3.1/0.3. The crystallization temperature was 221° C., and MFR was 20.5 g/10 min. The fuel permeation coefficient of a film obtained by molding ETFE (A1) was 3.7 g·mm/m²·day, and the number of MIT bending times was 126000 times.

PREPARATION EXAMPLE 2

Preparation of ETFE (A2)

A stainless steel autoclave having an internal capacity of 94 litters and equipped with a stirrer, was deaerated, and 55.2 kg of perfluoropentyldifluoromethane, 11.4 kg of AK225cb, 108 g of $CH_2=CH(CF_2)_4F$, 18.0 kg of HEP, and 10.3 kg of TFE and 352 g of E were injected, and the interior of the autoclave was heated to 66° C. The pressure at that time was 1.63 MPa. As a polymerization initiator, 28 g of tert-butyl peroxypivalate was charged to initiate the polymerization. A monomer mixture gas having a molar ratio of TFE/E=60/40 was continuously charged to maintain the pressure to be constant during the polymerization. Further, $CH_2=CH(CF_2)_4F$ in an amount corresponding to 0.4 mol % and itaconic anhydride in an amount corresponding to 0.3 mol %, based on the total molar amount of TFE and E charged during the polymerization, were continuously charged. Upon expiration of 5.0 hours from the initiation of the polymerization and when 4.5 kg of the monomer mixture gas was charged, the internal temperature of the autoclave was cooled to room temperature, and the pressure in the autoclave was purged to normal pressure. Granulation was carried out in the same manner as in Example 1 except that the obtained ETFE (A2) in a slurry form, was used, to obtain 5.5 kg of granules (A2) of ETFE (A2).

The composition of ETFE (A2) was such that the molar ratio of polymerized units based on TFE/polymerized units based on E/polymerized units based on hexafluoropropylene/polymerized units based on $CH_2=CH(CF_2)_4F$/polymerized units based on itaconic anhydride, was 58.1/37.9/3.2/0.6/0.2. The crystallization temperature was 218° C., and MFR was 23.0 g/10 min. The fuel permeation coefficient of a film obtained by molding ETFE (A2) was 4.0 g·mm/m²·day, and the number of MIT bending times was 88000 times.

PREPARATION EXAMPLE 3

Preparation of Thermoplastic Fluoropolymer (B1)

A stainless steel autoclave having an internal capacity of 94 litters and equipped with a stirrer, was deaerated, and 71.0 kg of perfluoropentyldifluoromethane, 27.3 kg of AK225cb, 150 g of $CH_2=CH(CF_2)_2F$, 12.6 kg of TFE and 752 g of E, were injected, and the interior of the autoclave was heated to 66° C. The pressure at that time was 1.53 MPa. As a polymerization initiator, 9 g of tert-butyl peroxypivalate was charged to initiate the polymerization. A monomer mixture gas having a molar ratio of TFE/E=51/46 was continuously charged to maintain the pressure to be constant during the polymerization. Further, $CH_2=CH(CF_2)_2F$ in an amount corresponding to 0.7 mol % based on the total molar amount of TFE and E charged during the polymerization, was continuously charged. Upon expiration of 5.7 hours from the initiation of the polymerization and when 11.5 kg of the monomer mixture gas was charged, the inner temperature of the autoclave was cooled to room temperature, and the pressure in the autoclave was purged to normal pressure. Granulation was carried out in the same manner as in Example 1 except that the obtained thermoplastic fluoropolymer (B1) in a slurry form was used, to obtain 12.5 kg of granules (B1) of the thermoplastic fluoropolymer (B1).

The composition of the thermoplastic fluoropolymer (B1) was such that the molar ratio of polymerized units based on TFE/polymerized units based on E/polymerized units based on $CH_2=CH(CF_2)_2F$ was 53.7/45.6/0.7. The crystallization temperature of the thermoplastic fluoropolymer (B1) was 255° C., and MFR was 40.5 g/10 min.

PREPARATION EXAMPLE 4

Preparation of Thermoplastic Fluoropolymer (B2)

Polymerization and granulation operations were carried out in the same manner as in Preparation Example 1 except that no itaconic anhydride was charged during the polymerization, to obtain 12.1 kg of granules (B2) of a thermoplastic fluoropolymer (B2). The composition of the thermoplastic fluoropolymer (B2) was such that the molar ratio of polymerized units based on TFE/polymerized units based on E/polymerized units based on $CH_2=CH(CF_2)_2F$, was 58.5/38.2/3.3. The crystallization temperature of the thermoplastic fluoropolymer (B2) was 225° C., and MFR was 25.5 g/10 min. The fuel permeation coefficient of a film obtained by molding the thermoplastic fluoropolymer (B2) was 3.2 g·mm/m²·day, and the number of MIT bending times was 75000 times.

EXAMPLE 1

90 parts by mass of granules (A1) and 10 parts by mass of granules (B1) were dry-blended and then, melt-kneaded by means of a twin screw extruder at a temperature of 260° C. for a retention time of 2 minutes to prepare pellets 1 of ETFE composition 1. The crystallization temperature of ETFE composition 1 was 222° C. The fuel permeation coefficient of a film obtained by molding pellets 1 was 2.6 g·mm/m²·day, and the number of MIT bending times was 156000 times.

EXAMPLE 2

Pellets 2 of ETFE composition 2 were prepared in the same manner as in Example 1 except that granules (A2) were used instead of granules (A1). The crystallization temperature of ETFE composition 2 was 220° C. The fuel permeation coefficient of a film obtained by molding pellets 2 was 2.9 g·mm/m²·day, and the number of MIT bending times was 96000 times.

EXAMPLE 3

20 parts by mass of granules (A1) and 80 parts by mass of granules (B2) were dry-blended and then, melt-kneaded by means of a single screw extruder at 280° C. for a retention time of 5 minutes to obtain pellets 3 of ETFE composition 3. The crystallization temperature of ETFE composition 3 was 225° C. The fuel permeation coefficient of a film obtained by molding pellets 3 was 3.2 g·mm/m²day, and the number of MIT bending times was 103000 times.

EXAMPLE 4

17 parts by mass of granules (A1), 70 parts by mass of granules (B2) and 13 parts by mass of carbon black (DENKA BLACK, nitrogen adsorption specific surface area: 71 m²/g, DBP absorption: 160 ml/100 g, manufactured by Denki Kagaku Kogyo Kabushiki Kaisha) were dry-blended and then, melt-kneaded by means of a twin screw extruder at 250° C. for a retention time of 2 minutes to obtain pellets 4 of ETFE composition 4. The crystallization temperature of ETFE composition 4 was 225° C. The fuel permeation coefficient of a film obtained by molding pellets 4 was 2.3 g·mm/m²day. The volume resistivity of the obtained film was 3×10² Ω·cm.

EXAMPLE 5

20 parts by mass of granules (A1), 77 parts by mass of granules (B2) and 3 parts by mass of carbon nanotube (nitrogen adsorption specific surface area: 250 m²/g, DBP absorption: 450 ml/100 g, manufactured by ILJIN Company) were dry-blended and then, melt-kneaded by means of a twin screw extruder at 260° C. for a retention time of 2 minutes to obtain pellets 4 of ETFE composition 4. The crystallization temperature of ETFE composition 4 was 225° C. The fuel permeation coefficient of a film obtained by molding pellets 4 was 2.5 g·mm/m²day. The volume resistivity of the obtained film was 1 Ω·cm.

Applications of the ETFE composition of the present invention include formed products such as hoses, films or tanks. Further, a multilayered laminate containing a layer of the ETFE composition of the present invention and a layer of a thermoplastic resin such as polyamide, is preferred.

Specific examples of the applications include fuel hoses for automobiles, fuel tanks for automobiles, industrial hoses and tanks, hoses for food products, weather resistant films, chemical resistant linings, etc. Especially, the ETFE composition of the present invention is extremely useful for applications to fuel hoses for automobiles or fuel tanks for automobiles where fuel barrier properties are required, since its formed product is excellent in mechanical properties, fuel barrier properties and gas barrier properties.

The entire disclosures of Japanese Patent Application No. 2002-292367 filed on Oct. 4, 2002, Japanese Patent Application No. 2003-108874 filed on Apr. 14, 2003 and Japanese Patent Application No. 2003-289876 filed on Aug. 8, 2003 including specifications, claims and summaries are incorporated herein by reference in their entireties.

What is claimed is:

1. A tetrafluoroethylene/ethylene copolymer composition comprising a tetrafluoroethylene/ethylene copolymer (A) and a thermoplastic fluoropolymer (B) having a crystallization temperature higher than the crystallization temperature of said tetrafluoroethylene/ethylene copolymer (A) in a mass ratio of (A)/(B)=from 99.8/0.2 to 1/99.

2. The tetrafluoroethylene/ethylene copolymer composition according to claim 1, wherein the tetrafluoroethylene/ethylene copolymer (A) contains polymerized units based on a polymerizable unsaturated compound having an acid anhydride structure.

3. The tetrafluoroethylene/ethylene copolymer composition according to claim 2, wherein the content of the polymerized units based on a polymerizable unsaturated compound having an acid anhydride structure is from 0.05 to 5 mol % based on the total polymerized units in the tetrafluoroethylene/ethylene copolymer (A).

4. The tetrafluoroethylene/ethylene copolymer composition according to claim 1, wherein the molar ratio of polymerized units based on tetrafluoroethylene/polymerized units based on ethylene in the tetrafluoroethylene/ethylene copolymer (A) is from 40/60 to 80/20.

5. The tetrafluoroethylene/ethylene copolymer composition according to claim 1, wherein the tetrafluoroethylene/ethylene copolymer (A) contains polymerized units based on $CH_2=CH(CF_2)_2F$ or $CH_{2=CH(CF_2)}{}_4F$.

6. The tetrafluoroethylene/ethylene copolymer composition according to claim 1, wherein the thermoplastic fluoropolymer (B) is at least one member selected from the group consisting of a tetrafluoroethylene/ethylene copolymer, a tetrafluoroethylene/hexafluoropropylene copolymer, a tetrafluoroethylene/$CF_2=CFOC_3F_7$ copolymer, a chlorotrifluoroethylene/ethylene copolymer and tetrafluoroethylene/vinylidene fluoride/hexafluoropropylene copolymer.

7. The tetrafluoroethylene/ethylene copolymer composition according to claim 1, wherein the thermoplastic fluoropolymer (B) is a tetrafluoroethylene/ethylene copolymer.

8. The tetrafluoroethylene/ethylene copolymer composition according to claim 1, which further contains an electroconductive filler.

9. The tetrafluoroethylene/ethylene copolymer composition according to claim 8, wherein the content of the electroconductive filler is from 0.1 to 15 mass % based on the total amount of the tetrafluoroethylene/ethylene copolymer (A) and the thermoplastic fluoropolymer (B).

10. A tetrafluoroethylene/ethylene copolymer composition comprising a tetrafluoroethylene/ethylene copolymer (A) and a thermoplastic fluoropolymer (B) having a crystallization temperature higher by from 3 to 150° C. than the crystallization temperature of said tetrafluoroethylene/ethylene copolymer (A) in a mass ratio of (A)/(B)=from 99.8/0.2 to 10/90.

11. The tetrafluoroethylene/ethylene copolymer composition according to claim 10, wherein the tetrafluoroethylene/ethylene copolymer (A) contains polymerized units based on a polymerizable unsaturated compound having an acid anhydride structure.

12. The tetrafluoroethylene/ethylene copolymer composition according to claim 11, wherein the content of the polymerized units based on a polymerizable unsaturated compound having an acid anhydride structure is from 0.05 to 5 mol % based on the total polymerized units in the tetrafluoroethylene/ethylene copolymer (A).

13. The tetrafluoroethylene/ethylene copolymer composition according to claim 10, wherein the molar ratio of polymerized units based on tetrafluoroethylene/polymerized units based on ethylene in the tetrafluoroethylene/ethylene copolymer (A) is from 40/60 to 80/20.

14. The tetrafluoroethylene/ethylene copolymer composition according to claim 10, wherein the tetrafluoroethylene/ethylene copolymer (A) contains polymerized units based on $CH_2=CH(CF_2)_2F$ or $CH_2=CH(CF_2)_4F$.

15. The tetrafluoroethylene/ethylene copolymer composition according to claim 10, wherein the thermoplastic fluoropolymer (B) is at least one member selected from the group consisting of a tetrafluoroethylene/ethylene copolymer, a tetrafluoroethylene/hexafluoropropylene copolymer, a tetrafluoroethylene/$CF_2=CFOC_3F_7$ copolymer, a chlorotrifluoroethylene/ethylene copolymer and tetrafluoroethylene/vinylidene fluoride/hexafluoropropylene copolymer.

16. The tetrafluoroethylene/ethylene copolymer composition according to claim 10, wherein the thermoplastic fluoropolymer (B) is a tetrafluoroethylene/ethylene copolymer.

17. The tetrafluoroethylene/ethylene copolymer composition according to claim 10, which further contains an electroconductive filler.

18. The tetrafluoroethylene/ethylene copolymer composition according to claim 17, wherein the content of the electroconductive filler is from 0.1 to 15 mass % based on the total amount of the tetrafluoroethylene/ethylene copolymer (A) and the thermoplastic fluoropolymer (B).

* * * * *